Patented Mar. 3, 1925.

1,528,006

UNITED STATES PATENT OFFICE.

HAROLD C. CHEETHAM, OF CHICAGO, ILLINOIS, ASSIGNOR TO BAKELITE CORPORATION, OF NEW YORK, N. Y., A CORPORATION OF DELAWARE.

PHENOLIC RESIN VARNISH.

No Drawing. Application filed February 23, 1923. Serial No. 620,836.

*To all whom it may concern:*

Be it known that I, HAROLD C. CHEETHAM, a citizen of the United States, residing at Chicago, in the county of Cook and State of Illinois, have invented certain new and useful Improvements in Phenolic Resin Varnishes, of which the following is a specification.

This invention relates to varnishes, lacquers, impregnating liquids and similar liquid coating compositions, and comprises a liquid of this character containing as its essential components a phenolic resin of the potentially reactive type, an organic solvent therefor, and an organic modifying ingredient. The modifying ingredient is itself a solvent for the resin, has a higher boiling point than the other organic solvent, and possesses an aldehyde character. My preferred modifying agent is furfural (furfuraldehyde) which possesses all of these characteristics in a degree which renders it especially well adapted for the purposes of this invention.

A typical embodiment of the invention is as follows, it being understood that the invention is not restricted to the particular materials or proportions therein stated.

Fifty pounds of a potentially reactive phenolic resin are dissolved in one hundred pounds of denatured alcohol, and about twenty pounds of furfural. The proportion of furfural used may be widely varied, since it is a true solvent for the resin and the excess may be driven off by continued heating of the varnish film. Usually however I prefer to use it in a proportion between twenty and sixty percent by weight of the resin component of the varnish. The proportion of alcohol or equivalent organic solvent (acetone etc.) may of course be varied according to the consistency required for particular applications of the solution. Also other solvents or solvent mixtures, thinners or the like may be added without departure from my invention.

As will readily be understood by those familiar with this art, the expression "potentially reactive resin" is used to designate such resins or resin-containing compositions as are initially soluble and fusible, but become infusible by application of sufficient heat. These potentially reactive compositions are readily prepared by incorporating with a phenolic resin of the permanently fusible and soluble type sufficient hexamethylenetetramine or similar methylene-containing body to effect its transformation, under the influence of heat, to a resin of the infusible type. Naturally therefore the varnish according to the present invention may comprise either such initial reaction products of phenol and formaldehyde or its equivalents as are directly transformable to the infusible condition; or, alternatively, such combinations of permanently fusible resins and methylene-containing hardening agents as are similarly transformable; both of these being potentially reactive resins within the meaning of this specification.

Furfural, used as herein indicated, performs several important functions:

(1) It possesses greater "cutting power" for the resin than does alcohol, and hence imparts increased fluidity and penetrating and impregnating quality to the varnish.

(2) The varnish possesses greater coating power, can be spread more thinly, and retains a more glossy film.

(3) The furfural assists in the escape of any moisture from the initial film, in contradistinction from alcohol which tends to escape before or with the water, with attendant formation of bubbles in the film.

(4) Furfural, like other bodies of aldehyde characteristics, is capable of reacting upon the resin as well as of acting as a solvent therefor: its use yields therefore a tougher more elastic, and continuous film.

(5) The furfural tends to absorb a portion at least of the ammonia liberated from the hexamethylenetetramine during the setting of the varnish, thereby preventing the formation of bubbles in the film.

I do not limit my invention to the employment of furfural since other bodies of aldehyde character, relatively high molecular weight and boiling point, and good solvent power for the resin, as for example benzaldehyde, are capable of affording some at least of the advantages above stated. Furfural is however used in the preferred embodiment of my invention.

I claim:

1. A liquid coating composition comprising a phenolic resin of the potentially reactive type, an organic solvent therefor, and a modifying ingredient having solvent power for the resin and an aldehyde character.

2. A liquid coating composition comprising a phenolic resin of a potentially reactive type, an organic solvent therefor, and furfural.

3. Composition according to claim 1, wherein the reactive resin comprises a permanently fusible phenolic resin and a methylene-containing hardening agent therefor.

4. Composition according to claim 1, wherein the reactive resin comprises a permanently fusible phenolic resin and hexamethylenetetramine.

5. Composition according to claim 2, wherein the reactive resin comprises a permanently fusible phenolic resin and a methylene-containing hardening agent therefor.

6. Composition according to claim 2, wherein the reactive resin comprises a permanently fusible phenolic resin and hexamethylenetetramine.

In testimony whereof, I affix my signature.

HAROLD C. CHEETHAM.